F. M. DALE.
AUTOMOBILE TIMEPIECE ATTACHMENT.
APPLICATION FILED DEC. 18, 1914.
1,153,609.
Patented Sept. 14, 1915.
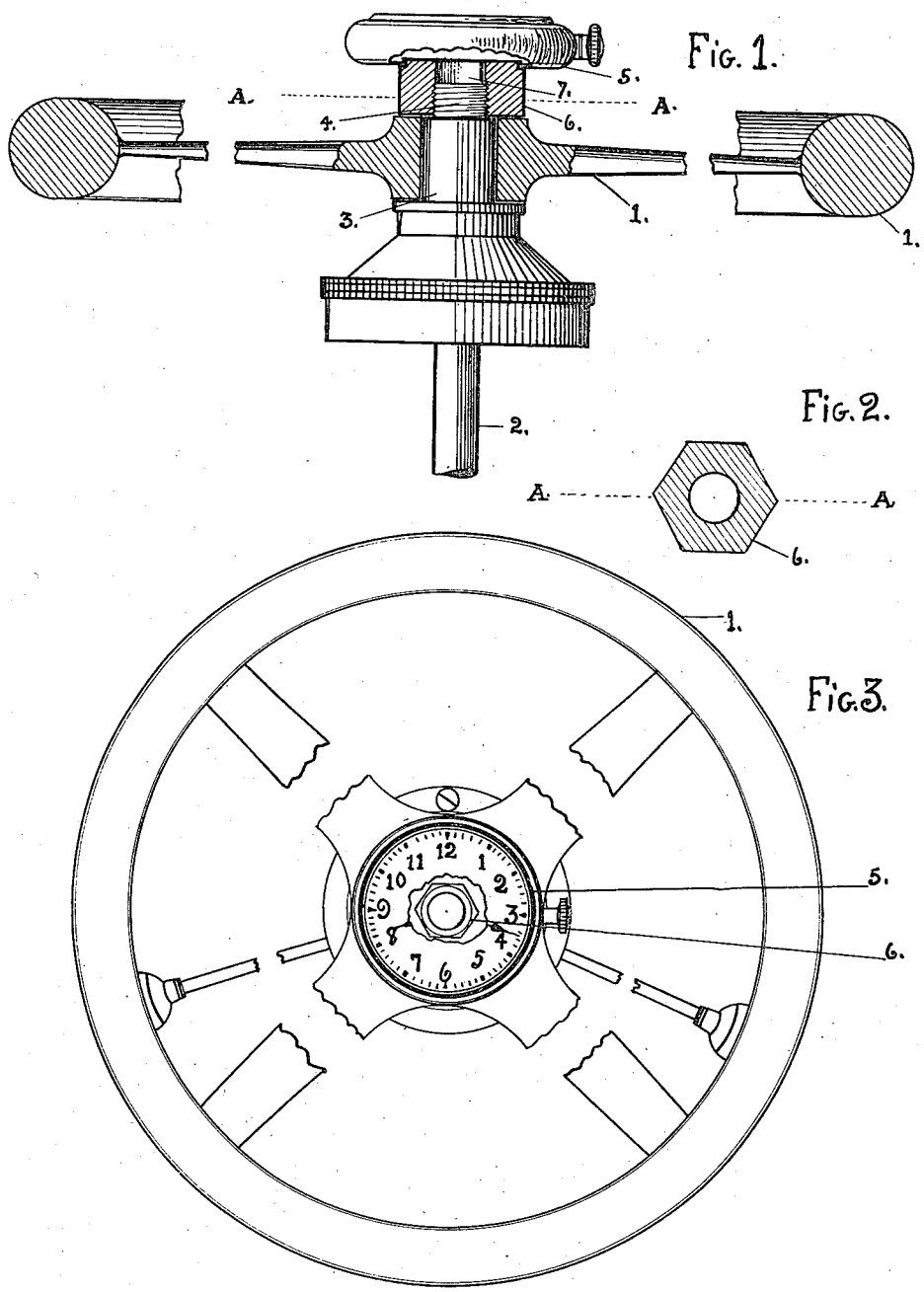

UNITED STATES PATENT OFFICE.

FRANK M. DALE, OF SULLIVAN, INDIANA, ASSIGNOR TO MOTORING CLOCK MANUFACTURING COMPANY, OF SULLIVAN, INDIANA, A CORPORATION OF INDIANA.

AUTOMOBILE TIMEPIECE ATTACHMENT.

1,153,609.   Specification of Letters Patent.   Patented Sept. 14, 1915.

Application filed December 18, 1914.   Serial No. 877,864.

*To all whom it may concern:*

Be it known that I, FRANK M. DALE, a citizen of the United States, residing at Sullivan, Sullivan county, and State of Indiana, have invented and discovered certain new and useful Improvements in Automobile Timepiece Attachments, of which the following is a specification.

My invention relates to time-piece attachments for automobiles and its object is to provide means whereby a watch may be combined with the steering wheel of an automobile so that the time-piece will be readily accessible and displayed to view at a point where the time can be easily observed.

With this object and others in view my invention is embodied in preferable form in the arrangement and construction hereinafter described and illustrated in the accompanying drawings.

In these drawings, Figure 1 is a side view in elevation, partly in section of a steering wheel, showing my invention applied thereto; Fig. 2, a section on the line A—A of Fig. 1 and Fig. 3 a top plan view of the steering wheel.

Referring to the drawings, 1 is the steering wheel of an automobile; 2 the lower part of the shaft or rod of said steering wheel and 3 the enlarged stem on which the hub of the steering wheel is mounted. Projecting upwardly beyond this stem is a threaded end portion 4, forming part of the shaft. Adapted to be mounted on this threaded end portion is a watch 5. Adapted to be fixed to the rear face of the case of the watch by solder or other suitable means of connection is a depending hollow nut or attaching member 6, which is secured upon the threaded end 4 of the shaft and is adapted to be forced down until its lower end abuts against the upper surface of the stem 3. This nut or connecting member is provided with a hollow chamber or space 7 which separates the casing of the watch from the end of the threaded portion 4, thereby avoiding pressure against the watch case and the works of the watch. The nut 6 serves to bear against the hub of the steering wheel and to lock the same on the shaft, thus taking the place of the usual nut employed for this purpose.

Having thus described my invention what I claim is:

1. In combination with a steering wheel of an automobile and the shaft of said wheel, said shaft having an integral portion extending above the hub of the steering wheel, a time piece, and a support for said time piece having means to engage said extended portion of said shaft.

2. In combination with a steering wheel of an automobile and the shaft of said wheel, said shaft having a threaded portion extending above the hub of the steering wheel, a time piece, and a nut for said threaded portion to hold said hub in place on the shaft and also constituting supporting means for said time piece.

3. In combination with a steering wheel of an automobile and the shaft of said wheel, said shaft having an integral portion extending above the hub of the steering wheel, a time piece having an integral depending attaching member and means of direct engagement between said member and said prolonged portion of said shaft, substantially as described.

4. In combination with a steering wheel of an automobile and its shaft, said shaft having a threaded portion extending above the hub of the steering wheel, a time-piece, a nut fixed to one face of said time-piece and adapted to engage said threaded end portion of the shaft, substantially as described.

5. In combination with a steering wheel and its shaft, such shaft having a threaded portion extending above the hub of the steering wheel, a time piece, said time piece having fixed on one face thereof a nut which engages said threaded end portion and bears against said hub to fasten the time-piece to said shaft and lock the steering wheel in position, substantially as described.

6. In combination with the steering wheel of an automobile and its shaft, said shaft having a threaded end portion extending above the hub of the wheel, a time piece, said time piece having a nut fixed to one face thereof and adapted to engage said threaded end of the shaft and to bear against said hub to lock the wheel to the shaft, said nut being elongated beyond the length of said threaded portion to space the case of the time-piece from the end of said threaded portion, substantially as described.

In witness whereof, I have hereunto set my hand and seal at Sullivan, Sullivan county, Indiana this 30th day of November, A. D. nineteen hundred and fourteen.

FRANK M. DALE. [L. S.]

Witnesses:
 THEODORE F. SEITZ,
 ARTHUR W. SNAVELY.